(12) United States Patent
Yamagata (10) Patent No.: US 7,838,815 B2
(45) Date of Patent: Nov. 23, 2010

(54) ROTARY ENCODER HAVING A SUPPORT BODY ROTATABLE WITH A ROTATOR, APPARATUS AND SYSTEM FOR DETECTING A ROTATIONAL MOVEMENT OF A ROTATOR USING THE ROTARY ENCODER

(75) Inventor: Masanobu Yamagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1089 days.

(21) Appl. No.: 11/408,014

(22) Filed: Apr. 21, 2006

(65) Prior Publication Data
US 2006/0250292 A1 Nov. 9, 2006

(30) Foreign Application Priority Data
Apr. 25, 2005 (JP) ............................ 2005-126357
Apr. 25, 2005 (JP) ............................ 2005-126514

(51) Int. Cl.
*G01D 5/34* (2006.01)
(52) U.S. Cl. ................................. 250/231.13; 250/239
(58) Field of Classification Search ............ 250/231.13, 250/239, 236, 221; 341/11, 13; 318/9, 14, 318/15
See application file for complete search history.

(56) References Cited

U.S. PATENT DOCUMENTS

| 4,637,264 A | * | 1/1987 | Takahashi et al. ...... 73/862.324 |
| 5,949,470 A | | 9/1999 | Nakajima et al. |

FOREIGN PATENT DOCUMENTS

| JP | 60-113109 | 6/1985 |
| JP | 63-292758 | 11/1988 |
| JP | 64-34511 | 3/1989 |
| JP | 6-3160 | 1/1994 |
| JP | 7-5373 | 2/1995 |
| JP | 7-253335 | 10/1995 |
| JP | 10-300511 | 11/1998 |
| JP | 3221161 | 8/2001 |
| JP | 2002-248822 | 9/2002 |
| JP | 2005-134763 | 5/2005 |
| JP | 4175785 | 8/2008 |
| JP | 4246559 | 1/2009 |

* cited by examiner

*Primary Examiner*—Que T Le
(74) *Attorney, Agent, or Firm*—Oblon, Spivak, McClelland, Maier & Neustadt, L.L.P.

(57) ABSTRACT

A rotary encoder capable of detecting a rotational movement of a rotator with high accuracy, and an apparatus and system for detecting the rotational movement of the rotator using the rotary encoder.

19 Claims, 4 Drawing Sheets

ROTARY ENCODER HAVING A SUPPORT BODY ROTATABLE WITH A ROTATOR, APPARATUS AND SYSTEM FOR DETECTING A ROTATIONAL MOVEMENT OF A ROTATOR USING THE ROTARY ENCODER

CROSS-REFERENCE TO RELATED APPLICATIONS

This patent application is related to and claims priority under 35 U.S.C. §119 to Japanese patent application Nos. 2005-126357 filed on Apr. 25, 2005, and 2005-126514 filed on Apr. 25, 2005, in the Japanese Patent Office, the entire contents of which are hereby incorporated by reference.

FIELD OF THE INVENTION

The following disclosure relates generally to a rotary encoder, and an apparatus and system for detecting the rotational movement of a rotator using the rotary encoder.

DESCRIPTION OF THE RELATED ART

A rotary encoder is a device coupled to a rotator that can detect the rotational movement of the rotator. For example, the rotary encoder includes a disc having a mark thereon that rotates together with a shaft of the rotator, and a sensor that detects the mark on the disc to output positional information of the mark. Using the positional information, the rotational movement of the rotator may be controlled.

While the rotary encoder is used in various applications, the use of rotary encoder may introduce some problems. In one example, the accuracy in detecting the rotational movement of the rotator ("detection accuracy") may be lowered if a foreign matter is introduced. For example, the rotary encoder may be incorporated in a transfer sheet device of an image forming apparatus to control a transfer operation of the transfer sheet device. Since the foreign matter, such as toner residues, dust from a recording sheet, or abrasion matter from a part of the transfer sheet device, may be easily introduced to the rotary encoder, the detection accuracy may be lowered, resulting in degradation in image quality.

In another example, downsizing of the rotary encoder is hardly achieved while maintaining the detection accuracy. For example, the size of the rotary encoder may be reduced if the thickness of a disc of the rotary encoder can be made thinner. However, the thinner disc may be easily deformed, causing the detection accuracy to decrease.

BRIEF SUMMARY OF THE INVENTION

In light of the above-described and other problems, in one example, the present invention provides a rotary encoder capable of detecting a rotational movement of a rotator with high accuracy.

In one example, the rotary encoder includes a support body, an encoder disc, and a cover. The support body is fixed to the shaft of the rotator so as to rotate together with the rotation of the rotator. The encoder disc is fixed to the support body so as to rotate together with the rotation of the support body. The cover is provided around the shaft of the rotator so as to stay unrotated while covering the encoder disc. The rotary encoder may additionally include an encoder sensor within the cover, which outputs a detection result. Further, the position of the cover relative to the shaft of the rotator may be fixed via a shaft receiver, which is fixed to the shaft receiver at a position within the cover.

In another example, the rotary encoder includes a support body and an encoder disc. The support body is fixed to the shaft of the rotator so as to rotate together with the rotation of the rotator. The encoder disc is fixed to the support body at a predetermined position so as to rotate together with the rotation of the support body. In one example, the predetermined position is made away from a contact portion formed between the shaft of the rotator and the support body, for example, by introducing a non-contact portion that separates the predetermined position and the contact portion. The rotary encoder may be additionally provided with an encoder sensor, which outputs a detection result.

In addition to the above-described example embodiments, the present invention may be implemented in various other ways.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
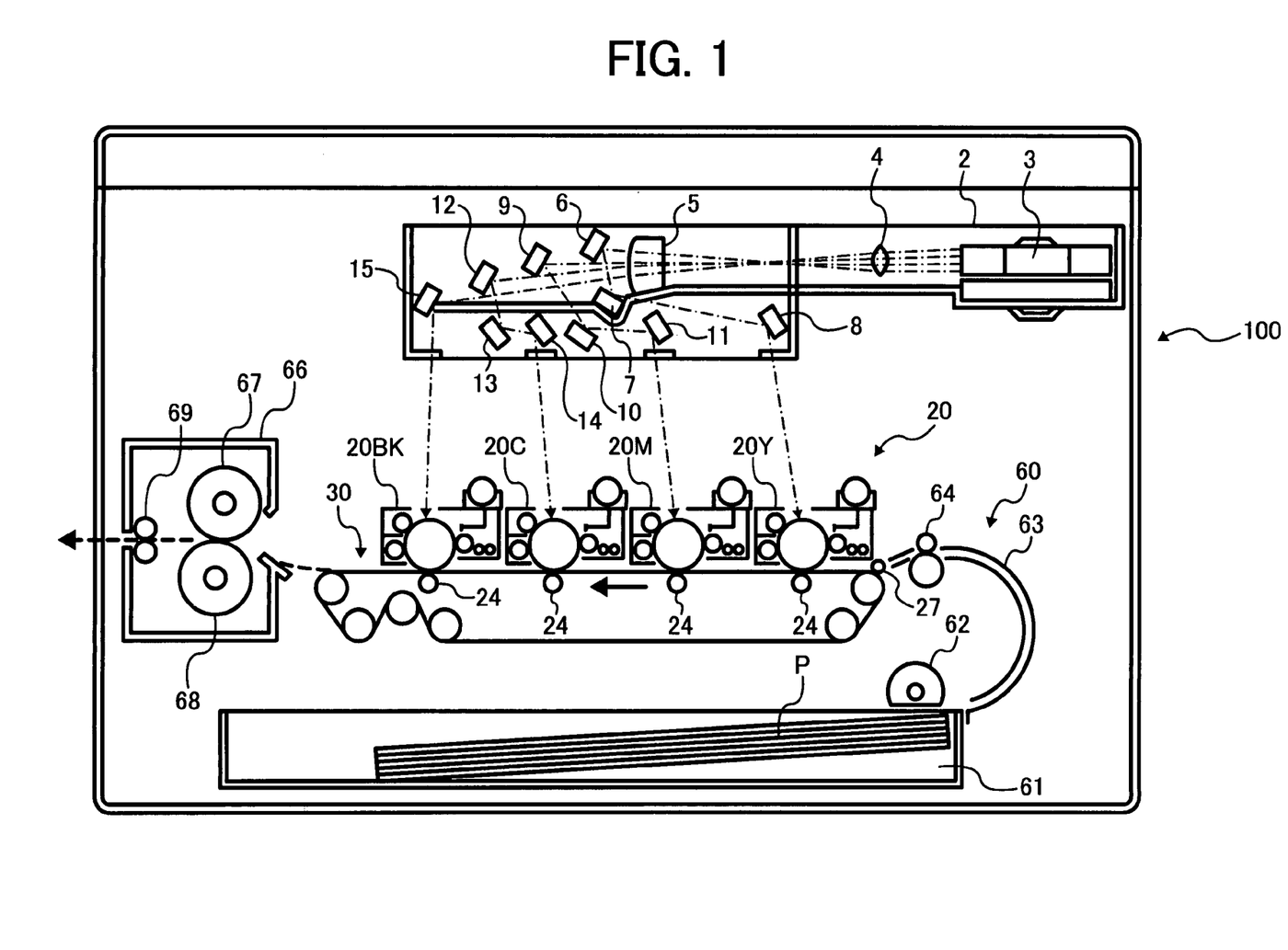
FIG. 1 is a schematic block diagram illustrating the structure of an image forming apparatus according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image forming apparatus 100 according to an example embodiment of the present invention. The image forming apparatus 100 mainly includes an optical writing device 2, an image forming device 20, a transfer device 30, a feeding device 60, and a fixing device 66.

The optical writing device 2 irradiates a laser light according to image data. As shown in FIG. 1, the optical writing device 2 includes a polygon mirror 3, a first lens 4, a second lens 5, and a plurality of mirrors 6 to 15. In addition to the elements shown in FIG. 1, the optical writing device 2 may include a light source capable of irradiating the laser light according to the image data.

Figure 2:
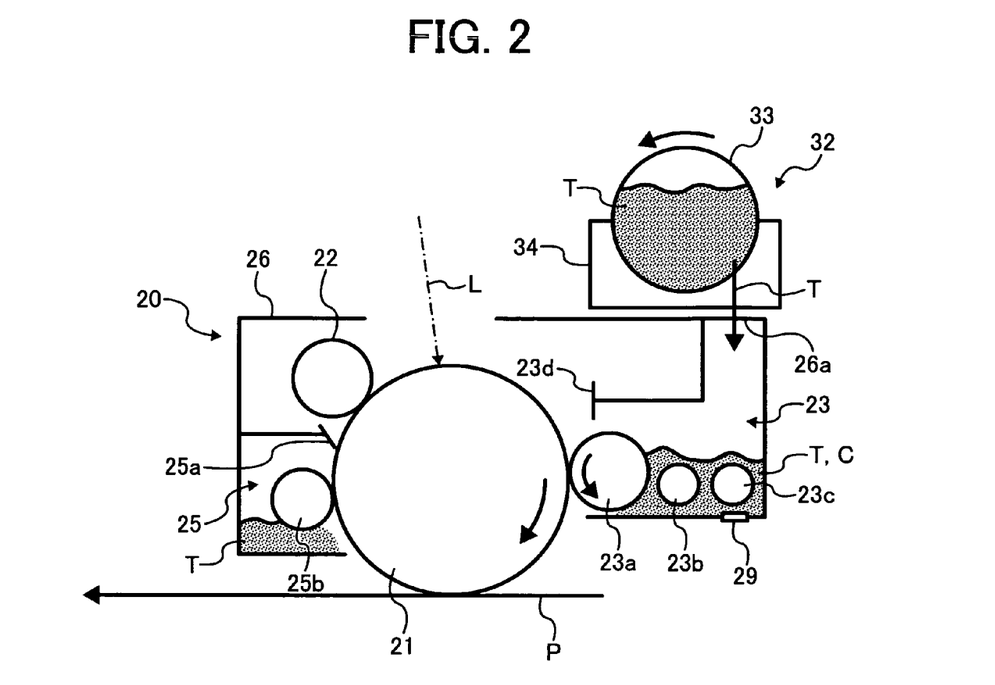
FIG. 2 is a schematic block diagram illustrating the structure of an image forming device shown in FIG. 1.

The image forming device 20 includes an image forming device 20BK for forming a black toner image, an image forming device 20C for forming a cyan toner image, an image forming device 20M for forming a magenta toner image, and an image forming device 20Y for forming a yellow toner image. In this example, the image forming device 20, or each one of the image forming devices 20BK, 20C, 20M, and 20Y, may be implemented by a process cartridge having the structure shown in FIG. 2. Referring to FIG. 2, the image forming device 20 includes a case 26 in which a photoconductor 21, a charger 22, a developer 23, and a cleaner 25 are stored, and a toner supplier 32 provided above the case 26. As shown in FIG. 1, the image forming device 20 additionally includes a transfer roller 24, which faces the photoconductor 21.

The feeding device 60 feeds a recording medium P, such as a recording sheet, to the transfer device 30. As shown in FIG. 1, the feeding device 60 mainly includes a medium storage 61, a feeding roller 62, a transfer guide 63, a registration roller 64, and an absorption roller 27.

Figure 3:
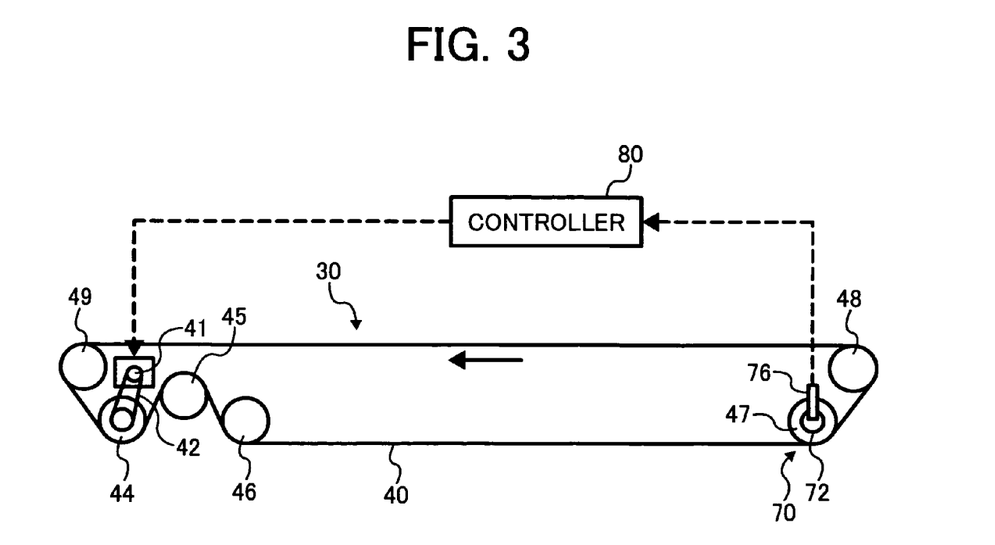
FIG. 3 is a schematic block diagram illustrating the structure of a transfer device of the image forming device shown in FIG. 1.

The transfer device 30 transfers the toner image formed by the image forming device 20 onto the recording medium P fed by the feeding device 60. As shown in FIG. 3, the transfer device 30 includes a transfer belt 40, a drive motor 41, a drive belt 42, a drive roller 44, and a plurality of driven rollers 45 to 49. The transfer device 30 additionally includes a rotary encoder 70, which is integrally provided with the driven roller 47. The rotary encoder 70 includes an encoder disc 72 and an encoder sensor 76 as shown in FIG. 3.

Referring back to FIG. 1, the fixing device 66 fixes the toner image onto the recording medium P before outputting the recording medium P. As shown in FIG. 1, the fixing device 66 includes a heating roller 67, a pressure roller 68, and a discharging roller 69.

The image forming apparatus 100 may be implemented in various other ways. For example, in addition to the elements shown in FIG. 1, the image forming apparatus 100 may include any other device, such as a scanner, automatic document feeder, sorter, stapler, removable medium storage, etc. Further, the image forming apparatus 100 may be connected to any device or apparatus via a network.

Still referring to FIG. 1, an operation of forming a full color image performed by the image forming apparatus 100 is explained according to an example embodiment of the present invention. The operation is performed when a color document is scanned into image data using the scanner.

The optical writing device 2 generates a laser light using the light source according to the image data. In this example, the image data has yellow, magenta, cyan, and black color components. Accordingly, as shown in FIG. 1, the laser light includes four light components respectively corresponding to the yellow, magenta, cyan, and black color components of the image data. The polygon mirror 3 directs the laser light toward the first and second lenses 4 and 5. The first and second lenses 4 and 5 further direct the laser light (indicated by "L" in FIG. 2) toward the image forming device 20. More specifically, as shown in FIG. 1, the first and second lenses 4 and 5 direct the yellow light component toward the mirror 6, the magenta light component toward the mirror 9, the cyan light component toward the mirror 12, and the black light component toward the mirror 15, respectively.

The yellow light component directed to the mirror 6 passes through the mirrors 7 and 8 toward the photoconductor 21 of the image forming device 20Y to form a yellow latent image. The magenta light component directed to the mirror 9 passes through the mirrors 10 and 11 toward the photoconductor 21 of the image forming device 20M to form a magenta latent image. The cyan light component directed to the mirror 12 passes through the mirror 13 and 14 toward the photoconductor 21 of the image forming device 20C to form a cyan latent image. The black light component directed to the mirror 15 is further directed to the photoconductor 21 of the image forming device 20BK to form a black latent image. For the descriptive purpose, the yellow, magenta, cyan, and black latent images are collectively referred to as a latent image.

Referring to FIG. 2, the photoconductor 21 of the image forming device 20 rotates in the direction indicated by an arrow. With this rotation, the surface of the photoconductor 21 is uniformly charged by the charger 22. When the laser light L directed from the optical writing device 2 reaches the charged surface of the photoconductor 21, the latent image is formed as described above.

The latent image formed on the surface of the photoconductor 21 is further transferred to the position ("developing position") facing the developer 23. At the developing position, which is a nip formed between the photoconductor 21 and a developing roller 23a of the developer 23, the latent image is developed into a toner image.

As shown in FIG. 2, a toner T is supplied from the toner supplier 32 to the developer 23. For example, when a toner sensor 29 provided in the developer 23 detects that the amount of toner T contained in the developer 23 is lower than a predetermined amount, the toner supplier 32 supplies the toner T from a toner bottle 33 to the developer 23 through a port 26a. Two agitators 23b and 23c of the developer 23 mix the toner T with a carrier C to form a developing agent. The developing agent is then carried by the developing roller 23a, which rotates in the direction indicated by an arrow, to the position facing a doctor blade 23d. The doctor blade 23d functions as an adjuster for adjusting the amount of developing agent. The developing agent having the adjusted amount is further transferred to the developing position. Due to a potential difference between the surface of the photoconductor 21 and the surface of the developing roller 23a, the toner T of the developing agent is transferred to the surface of the photoconductor 21 at the developing position. As a result, the latent image is developed into the toner image.

Referring back to FIG. 1, the feeding device 60 feeds the recording medium P from the medium storage 61 toward the registration roller 64 through the feeding roller 62 and the transfer guide 63. The recording medium P is then transferred to the transfer belt 40 at the position having a nip formed between the absorption roller 27 and the driven roller 48 (FIG. 3).

In this example, as shown in FIG. 3, the transfer belt 40, which is wound around the drive roller 44 and the plurality of driven rollers 45 to 49, rotates in the direction indicated by an arrow under control of a controller 80. For example, the drive roller 44 is rotated in the counterclockwise direction as a power from the drive motor 41 is transmitted through the drive belt 42. At the same time, the plurality of driven rollers 45 to 49, closely contacting the surface of the transfer belt 40, rotates in the counterclockwise direction. The rotary encoder 70 outputs a detection result to the controller 80, which is used to obtain the rotational movement of the driven roller 47. Based on the rotational movement obtained from the detection result, the controller 80 adjusts an operation of the drive motor 41. In this example, the detection result may be used to control the speed, position, distance, direction, etc., of the driven roller 47.

Referring back to FIG. 1, when the recording medium P passes through a nip formed between the photoconductor 21 and the transfer roller 24, the toner image formed on the surface of the photoconductor 21 is transferred to the recording medium P. More specifically, the yellow toner image, magenta toner image, cyan toner image, and black toner image are sequentially transferred onto the recording medium P carried by the transfer belt 40 to form a full color image.

After transfer of the toner image, a small portion of the toner T may remain on the surface of the photoconductor 21. As shown in FIG. 2, the remaining toner is collected by a cleaning blade 25a and a cleaning roller 25b of the cleaner 25. Further, the surface of the photoconductor 21 may be discharged by a discharger (not shown) of the image forming device 20.

Referring to FIG. 1, the recording medium P having the full color image is further transferred to the fixing device 66. At a nip formed between the heating roller 67 and the pressure roller 68, the full color image is fixed onto the recording medium P. The recording medium P is then output through the discharging roller 69 to complete image formation.

Figure 4:
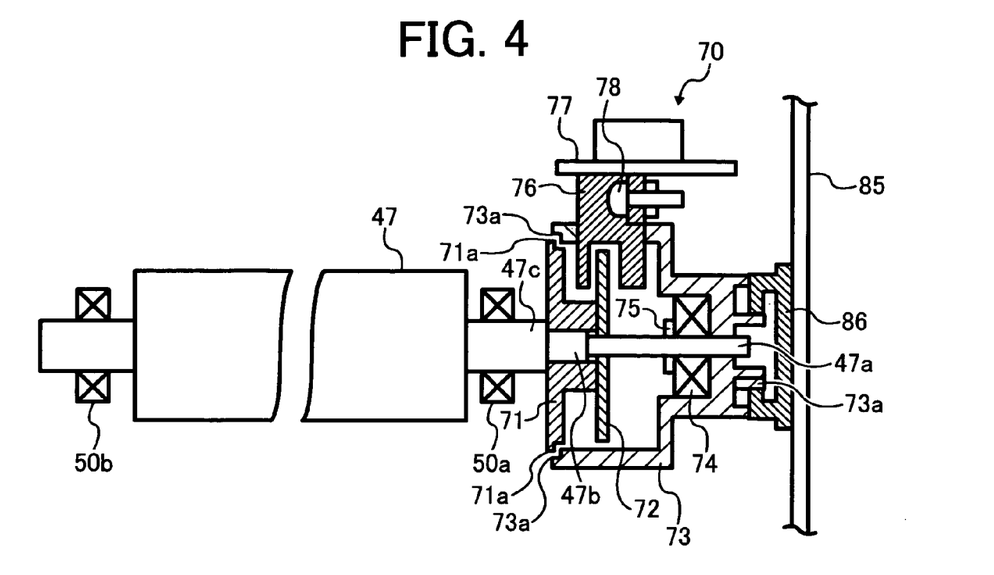
FIG. 4 is a cross-sectional view illustrating the structure of a rotary encoder of the transfer device shown in FIG. 3 according to an example embodiment of the present invention.
Figure 5:
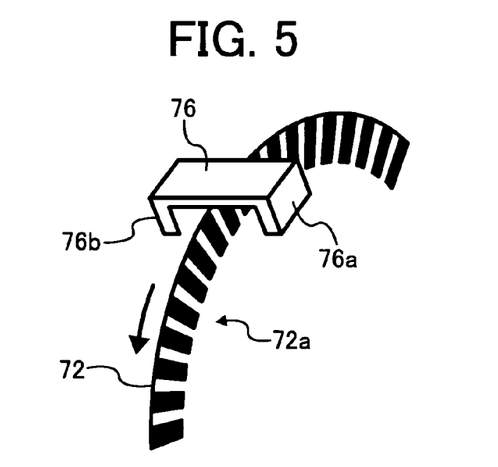
FIG. 5 is an enlarged view illustrating an encoder disc of the rotary encoder shown in FIG. 4.

Referring now to FIGS. 4 and 5, the structure of the rotary encoder 70 of FIG. 3 is explained according to an example embodiment of the present invention. As shown in FIG. 4, the rotary encoder 70 mainly includes a support body 71, the encoder disc 72, a cover 73 having a protrude 73a, a shaft receiver 74, a stopper 75, the encoder sensor 76, a base plate 77, a rivet 78, and an engager 86. For the descriptive purpose, the above-described elements of the rotary encoder 70 are explained in an order corresponding to the process of installing each element. However, the process of installing may not be limited to the example described below.

Referring to FIG. 4, the driven roller 47 has a shaft, which is fixed to the transfer device 30 via a first shaft receiver 50a provided at one side of the driven roller 47 and a second shaft receiver 50b provided at the other side of the driven roller 47. One end of the shaft of the driven roller 47 extends toward a side wall 85 of the transfer device 30. The shaft of the driven roller 47 has a first shaft section 47a located near the side wall 85, a second shaft section 47b located between the side wall 85 and the first shaft receiver 50a, and a third shaft section 47c corresponding to the remaining section of the shaft. As shown in FIG. 4, the first shaft section 47a is smaller in outer diameter size than either one of the second shaft section 47b and the third shaft section 47c. The second shaft section 47b is larger in outer diameter size than the first shaft section 47a but smaller in outer diameter size than the third shaft section 47c. The third shaft section 47c is larger in outer diameter size than either one of the first shaft section 47a and the second shaft section 47b. In this example, the driven roller 47 is made of a metal, such as stainless steel.

First, the support body 71, which is made of resin such as polyacetal, is fixed to the shaft of the driven roller 47. The support body 71 is implemented by a hat-shaped disc having a first side surface and a second side surface that face each other. In this example, the surface area of the first side surface is made smaller than the surface area of the second side surface. Further, the support body 71 is provided with a through hole, which goes through a center portion of the first side surface and a center portion of the second side surface. The through hole of the support body 71 has an inner diameter size that is substantially equal to the outer diameter size of the second shaft section 47b.

In this example, the support body 71 is fixed to the shaft of the driven roller 47 by causing the shaft of the driven roller 47 to go through the through hole of the support body 71. Since the second shaft section 47b is larger than the first shaft section 47a but smaller than the third shaft section 47c in outer diameter size, the position of the support body 71 relative to the shaft of the driven roller 47 can be fixed around the second shaft section 47b. Further, in this example, the first side surface of the support body 71 is placed so as to face the side wall 85. Since the support body 71 is fixed to the shaft of the driven roller 47, the support body 71 rotates with the rotation of the driven roller 47.

Figure 7:
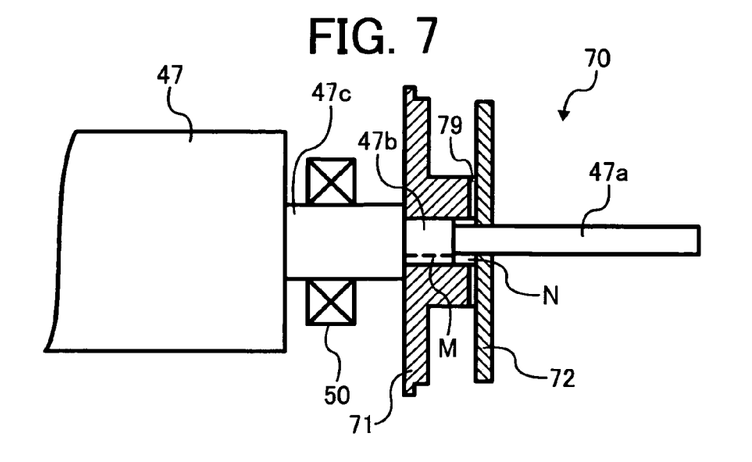
FIG. 7 is a partial view illustrating the structure of the rotary encoder shown in FIG. 4.

Second, the encoder disc 72 is attached to the first side surface of the support body 71, for example, by a double-sided tape 79 (FIG. 7). The encoder disc 72 has a through hole having an inner diameter size that is substantially equal to or greater than the outer diameter size of the first shaft section 47a. Accordingly, the shaft of the driven roller 47 can be inserted through the hole of the encoder disc 72 until the encoder disc 72 contacts the first side surface of the support body 71. In this example, the encoder disc 72 may be implemented by a codewheel made of flexible material such as polyethylene terephthalate (PET). The use of flexible material can suppress any damage on the encoder disc 72 or the encoder sensor 76, which may be caused when the encoder disc 72 and the encoder sensor 76 are in close contact. Further, the use of flexible material allows the encoder disc 72 to be thin. In this example, the encoder disc 72 has a thickness of about 0.2 mm. Since the encoder disc 72 is fixed to the support body 72, which rotates with the driven roller 47, the encoder disc 72 rotates with the rotation of the driven roller 47.

Third, the stopper 75 is provided at a predetermined position of the first shaft section 47a to help determine the position of the cover 73 relative to the shaft of the driven roller 47. The stopper 75 may be implemented by a disc having a through hole, to which the first shaft section 47a can be inserted.

Fourth, the cover 73 is provided so as to cover, together with the support body 71, the encoder disc 72. In this example, the cover 73 is implemented by a hat-shaped disc having a first section and a second section. As shown in FIG. 4, the surface area of the first section has an inner diameter size that is substantially equal to an outer diameter size of the shaft receiver 74. The surface area of the second section has an inner diameter size that is larger than an outer diameter size of the encoder disc 72 or an outer diameter size of the second side surface of the support body 71. The shaft receiver 74 can be pressed inside the first section of the cover 73, preferably before installing the cover 73 to the shaft of the driven roller 47.

In this example, the shaft receiver 74 is implemented by a ball bearing having an inner diameter size that corresponds to the outer diameter size of the first shaft section 47a. Further, the first section of the cover 73 is provided with a through hole having an inner diameter size that corresponds to the outer diameter size of the first shaft section 47a. Accordingly, the cover 73, integrated with the shaft receiver 74, can be pressed toward the support body 71, thus causing the first shaft section 47a to go through the holes of the shaft receiver 47a and the cover 73 until the shaft receiver 74 contacts the stopper 75.

To cause the first shaft section 47a to be easily inserted through the holes of the shaft receiver 74 and the cover 73, the inner diameter size of each hole may be made slightly larger than the outer diameter size of the first shaft section 47a, thus providing a backlash. This backlash is later eliminated so as to tightly fix the position of the cover 73. In this example, the protrude 73a, which can fill out a space generated by the backlash, may be previously provided to a protrude portion of the cover 73. The cover 73 is then fixed to the side wall 85 of the transfer device 30 through the engager 86. In this example, the engager 86, which is made of resin, forms a groove portion that corresponds to the protrude portion of the cover 73. When the engager 86 is engaged, the protrude portion of the cover 73 fits into the groove portion of the engager 86, thus securing the position of the cover 73. Since the cover 73 is fixed to the side wall 85 via the shaft receiver 74, the cover 73 stays unrotated even when the driven roller 47 rotates.

Fifth, the encoder sensor 76, which is integrally provided with the base plate 77, is fixed to the cover 73 through the rivet 78. As shown in FIG. 4, the second section of the cover 73 has a through hole that corresponds to the shape of the encoder sensor 76. As shown in FIG. 5, the encoder sensor 76 is formed into the U-shape with a concave section inside. The concave section of the encoder sensor 76 is inserted into the through hole of the cover 73 until the bottom part of the concave section reaches a predetermined position that closely faces the encoder disc 72. Once the encoder sensor 76 reaches the predetermined position, the encoder sensor 76 is fixed to the cover 73 using the rivet 78. In this example, the rivet 78 is made of resin such as nylon as it can provide relatively high positioning accuracy. However, the rivet 78 may be substituted by a screw or any other kind of engager. Since the encoder sensor 76 is fixed to the cover 73, which is stable, the encoder sensor 76 stays stable.

Further, in this example, the second section of the cover 73 has an opening that faces the first shaft receiver 50*a*. As shown in FIG. 4, the opening has an inner diameter size that is slighter larger than the outer diameter size of the second side surface of the support body 71. Accordingly, the support body 71 can be placed inside the cover 73 to cause the second side surface of the support body 71 to cover, together with the cover 73, the encoder disc 72, a portion of the encoder sensor 76, and the shaft receiver 74. Further, as shown in FIG. 4, the second side surface of the support body 71 and the cover 73 are positioned slightly apart from each other to have an opening between them. With this opening, any friction that may be caused when the support body 71 and the cover 73 are in close contact can be made small.

Figure 6:
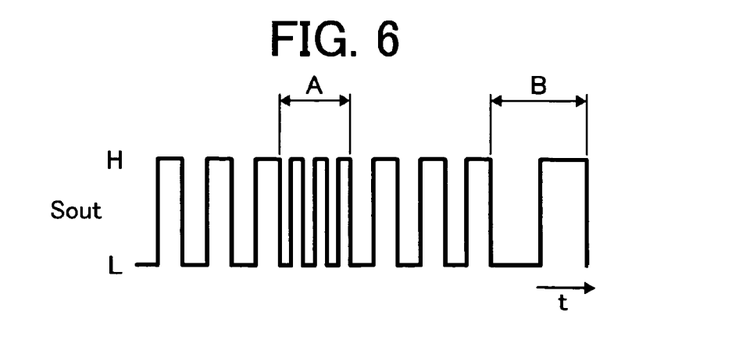
FIG. 6 is a timing chart illustrating an output signal generated by the rotary encoder shown in FIG. 4.

Referring now to FIGS. 5 and 6, the operation of detecting the rotational movement of the driven roller 47, performed by the rotary encoder 70, is explained according to an example embodiment of the present invention. In this example, the encoder sensor 76 obtains the detection result of the encoder disc 72 to detect the rotational movement of the driven roller 47.

As shown in FIG. 5, the encoder disc 72 has a code section 72*a* on its outer circumference. In the code section 72*a*, a plurality of first codes (indicated by the black color) and a plurality of second codes (indicated by the white color) are alternately formed along the central axis of the encoder disc 72. In this example, the first code does not transmit a light, while the second code does transmit a light.

Still referring to FIG. 5, the encoder sensor 76 may be implemented by any kind of photosensor, such as a reflective photosensor or a transmittive photosensor. In this example shown in FIG. 5, the transmittive photosensor is used. The encoder sensor 76 has a light emitting section 76*a* and a light receiving section 76*b*. The light emitting section 76*a* includes a light emitting element capable of emitting a light, while the light receiving section 76*b* includes a light receiving element capable of detecting a light. The encoder sensor 76 is provided such that a portion of the outer circumference of the encoder disc 72 is placed between the light emitting section 76*a* and the light receiving section 76*b*. For this reason, the first side surface of the support body 71 is made smaller in surface area than either one of the encoder disc 72 and the second side surface of the support body 71. When the first code (indicated by the black color) is positioned between the light emitting section 76*a* and the light receiving section 76*b*, the light emitted from the light emitting section 76*a* is not transmitted to the light receiving section 76*b*. Accordingly, the encoder sensor 76 outputs an output signal Sout having the high level "H" as shown in FIG. 6. When the second code (indicated by the white color) is positioned between the light emitting section 76*a* and the light receiving section 76*b*, the light emitted from the light emitting section 76*a* is transmitted to the light receiving section 76*b*. Accordingly, the encoder sensor 76 outputs an output signal Sout having the low level "L" as shown in FIG. 6. The controller 80 of FIG. 3 analyzes the wavelength of the output signal Sout of the encoder sensor 76 to detect the rotational movement of the driven roller 47.

For example, referring to FIG. 6, when the wavelength of the output signal Sout is relatively small as indicated by "A", the controller 80 determines that the rotational speed of the driven roller 47 is relatively high, and causes the drive motor 41 of FIG. 3 to decrease its drive speed. When the wavelength of the output signal Sout is relatively large as indicated by "B" in FIG. 6, the controller 80 determines that the rotational speed of the driven roller 47 is relatively low, and causes the drive motor 41 of FIG. 3 to increase its drive speed. Accordingly, the higher detection accuracy of the rotary encoder 70 can make the drive speed of the drive motor 41 stable, thus increasing image processing quality.

With the above-described structure shown in FIG. 4, the rotary encoder 70 may be protected from a foreign matter, which may be present in the transfer device 30, thus increasing the detection accuracy.

Specifically, in this example, the cover 73 is provided to cover, together with the second side surface of the support body 71, the encoder disc 72, the portion of the encoder sensor 76, and the shaft receiver 74. As described above referring to FIG. 5, the portion of the encoder sensor 76 at least includes the light emitting section 76*a* and the light receiving section 76*b*.

Further, in this example, entry of the foreign matter into the inside of the cover 73 is suppressed. As described above referring to FIG. 4, the cover 73 and the support body 71 are made apart from each other to form the opening to suppress the friction caused between the cover 73 and the support body 71. However, this opening may allow any foreign matter to enter the inside of the cover 73, thus damaging the encoder sensor 76 or the encoder disc 72. To suppress entry of the foreign matter, the support body 71 and the cover 73 are provided so as to form a nested box structure. For example, as shown in FIG. 4, the support body 71 has a step section 71*a* on the outer circumference of the second side surface. Similarly, the cover 73 has a step section 73*a* on the outer circumference of the second section. Alternatively, either one of the step sections 71*a* and 73*a* may be formed in different shape, as long as they can help the support body 71 and the cover 73 to form the nested box structure.

Furthermore, in addition to the foreign matter entering from the outside of the cover 73, the foreign matter may be generated inside the cover 73, such as the abrasion matter generated when the encoder sensor 76 and the encoder disc 72 are in close contact. Furthermore, despite of the nested structure described above, the foreign matter may still enter inside the cover 73 through the opening between the support body 71 and the cover 73.

To suppress any damage caused by the foreign matter, the position of the shaft receiver, or the number of shaft receiver may be controlled.

For example, if an additional shaft receiver is provided on the shaft of the driven roller 47 near the support body 71, where the foreign matter is most likely to be introduced, the foreign matter may cause the shaft of the driven roller 47 to fluctuate via the additional shaft receiver, thus lowering the detection accuracy of the rotary encoder 70.

However, in this example, the second side surface of the support body 71 functions as a part of the cover 73, thus reducing the size of the cover 73 toward the axial direction of the shaft. Accordingly, the cover 73 can be supported mainly by the shaft receiver 74, which is provided apart from the support body 71. Since no shaft receiver is provided at the position near the support body 71, the damage caused by the foreign matter on the shaft of the driven roller 47 may be reduced. Further, in this example, the number of shaft receivers can be limited to one.

Furthermore, even when the foreign matter is introduced near the shaft receiver 74, the foreign matter can hardly cause the shaft of the driven roller 47 to fluctuate via the shaft receiver 74 as the shaft receiver 74 is inserted into the first section of the cover 73, which is fixed to the wall section 85 via the engager 86.

Furthermore, the abrasion matter may be generated when the encoder sensor 76 and the encoder disc 72 are in close contact as described above. To suppress any damage from the abrasion matter, the encoder sensor 76 is preferably provided such that the position where the encoder sensor 76 and the encoder disc 72 are in close contact is located above relative to the direction of gravity. Accordingly, the abrasion matter generated at the position where the encoder sensor 76 and the encoder disc 72 are in close contact, if any, falls downward. In this manner, the position where the encoder sensor 76 and the encoder disc 72 at which the detection result is generated can be protected from the abrasion matter, thus increasing the detection accuracy.

In addition to protecting from the foreign matter, the detection accuracy can be further increased by suppressing deformation of the encoder disc 72.

As described above referring to FIG. 4, the encoder disc 72 is made of flexible material to make the encoder disc 72 thin. However, the encoder disc 72, which is relatively thin, may be easily deformed or become unstable if the encoder disc 72 is fixed directly to the shaft of the driven roller 47. To suppress this problem, the encoder disc 72 is attached to the support body 71, for example, via the double-sided tape 79 of FIG. 7.

Furthermore, as described above referring to FIG. 4, the support body 71 is fixed to the shaft of the driven roller 47 by inserting the shaft through the hole of the support body 71. Since the inner diameter size of the hole of the support body 71 is made substantially equal to the outer diameter size of the second shaft section 47b, a contact portion M (FIG. 7) formed between the support body 71 and the second shaft section 47b may be pressed such that the abrasion matter may be generated. The abrasion matter may be further accumulated near the first side surface of the support body 71, thus damaging the encoder disc 71 attached to the first side surface. To suppress any damage that may be caused by the abrasion matter, as shown in FIG. 7, the encoder disc 71 is provided away from the contact portion M via a non-contact portion N. In this example, the contact portion M may correspond to a portion that may be affected by the installation process of the support body 71, such as the contact portion formed between the support body 71 and the second shaft section 47b, or a portion of the inner wall of the support body 71 that is most likely to be abraded by the support body 71.

Figure 9:
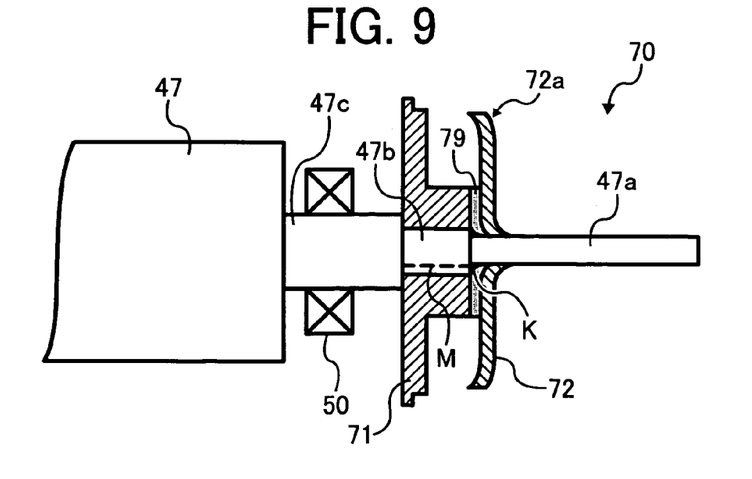
FIG. 9 is a partial view illustrating the structure of a rotary encoder of the transfer device shown in FIG. 3, when a non-contact portion is not provided.

For example, as shown in FIG. 9, if the encoder disc 72 is provided so as to contact the contact portion M, the abrasion matter (indicated by "K" in FIG. 9), may be accumulated between the first side surface of the support body 71 and the encoder disc 72. The abrasion matter may further cause the encoder disc 72 to deform, thus lowering the detection accuracy.

To suppress this problem, as shown in FIG. 7, the support body 71 is made such that it can form the non-contact portion near the first side surface. This non-contact portion N, which is a gap formed between the inner wall of the support body 71 and the first shaft section 47a, can store the abrasion matter within. As a result, the encoder disc 72 is not affected by the abrasion matter.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Figure 8:
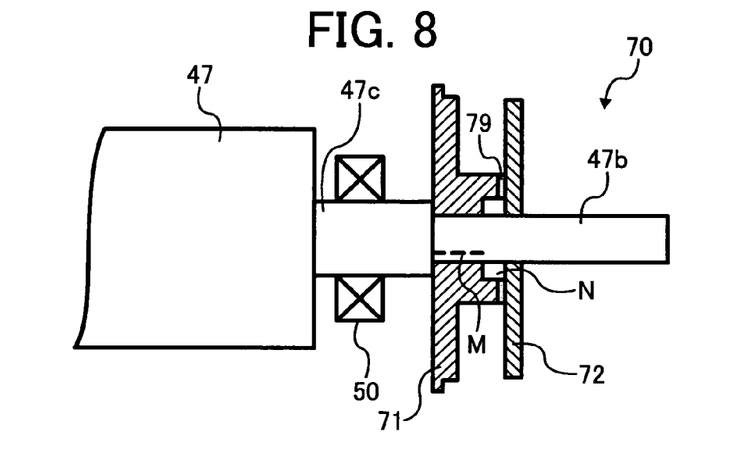
FIG. 8 is a cross-sectional view illustrating the structure of a rotary encoder of the transfer device shown in FIG. 3 according to an example embodiment of the present invention.

Further, the structure of the rotary encoder 70 is not limited to the structure shown in FIG. 4. For example, the rotary encoder 70 of FIG. 3 may have the structure shown in FIG. 8. The rotary encoder 70 of FIG. 8 is substantially similar in function of the rotary encoder 70 of FIG. 4. However, the function of suppressing deformation of the encoder disc 72 is performed by the shaft of the driven roller 47, the support body 71, and the non-contact portion N, each of which has a structure different from the structure shown in FIG. 4.

As shown in FIG. 8, the shaft of the driven roller 47 has the second shaft section 47b and the third shaft section 47c. The inner wall of the support body 71 includes a first inner diameter size that is substantially equal to the outer diameter size of the second shaft section, and a second inner diameter size that is larger than the outer diameter size of the second shaft section. With this structure, the support body 71 can form the contact portion M and the non-contact portion N with the second shaft section.

Similarly, the structure the rotary encoder 70, such as the number of elements, the position of each element, or the shape of each element, may be different from the structure shown in FIG. 4 or 8, as long as the rotary encoder 70 can perform at least one of the functions described above referring to any one of FIGS. 4 to 8.

Furthermore, the rotary encoder 70 may be provided to any one of the elements incorporated in the image forming apparatus 100 of FIG. 1. For example, the rotary encoder 70 may be provided to a shaft of the photoconductor 21 of FIG. 2 to control the rotational movement of the photoconductor 21.

Furthermore, the rotary encoder 70 may be implemented in any other kind of device or apparatus for image processing. For example, the rotary encoder 70 may be integrally provided with a roller member of an intermediate transfer device to control the movement of an intermediate transfer belt of the intermediate transfer device. In another example, the rotary encoder 70 may be integrally provided with a roller member of a photoconductor device to control the movement of a photoconductive belt of the photoconductor device.

Furthermore, the rotary encoder 70 may be incorporated in any other kind of apparatus, such as a photographic apparatus, computer input device, etc.

The invention claimed is:

1. A rotary encoder integrally provided with a rotator having a shaft, the rotary encoder comprising:
    a support body, having a first side surface and a second side surface, fixed to the shaft of the rotator and configured to rotate with the rotator;

an encoder disc fixed to the first side surface of the support body and configured to rotate with the support body;

an encoder sensor provided near the encoder disc and configured to output a detection result;

a shaft receiver fixed to the shaft of the rotator at a first position; and a cover, having an opening, provided around the shaft of the rotator via the shaft receiver and configured to cover, together with the second side surface of the support body, the first side surface of the support body, the encoder disc, the encoder sensor, and the shaft receiver.

2. The encoder of claim 1, wherein the cover if fixed to the shaft receiver at the first position, and the first position of the shaft receiver is away from the support body and the rotator.

3. The encoder of claim 1, further comprising:

a stopper fixed to the shaft of the rotator and configured to determine the first position of the shaft receiver.

4. The encoder of claim 1, wherein the second side surface of the support body and the cover are made a predetermined minimal distance apart from each other.

5. The encoder of claim 1, wherein the second side surface of the support body is inserted into the opening of the cover so as to form a nested box structure.

6. The encoder of claim 1, wherein the encoder sensor includes a light receiving section and a light transmitting section, which face each other.

7. The encoder of claim 6, wherein an outer circumference of the encoder disc is placed between the light receiving section and the light transmitting section.

8. The encoder of claim 7, wherein the first side surface of the support body is made smaller in surface area than the second side surface of the support body.

9. The encoder of claim 7, wherein a position where the encoder sensor and the outer circumference of the encoder disc are in close contact is positioned above the encoder disc relative to the direction of gravity.

10. The encoder of claim 1, wherein the shaft of the rotator includes a second shaft section having a second outer diameter size and a third shaft section having a third outer diameter size, with the third outer diameter size being larger than the second outer diameter size.

11. The encoder of claim 10, wherein a position of the second side surface area of the support body relative to the shaft of the rotator is determined by the third shaft section.

12. The encoder of claim 2, wherein the shaft of the rotator includes a first shaft section having a first outer diameter size and a second shaft section having a second outer diameter size, with the first outer diameter size being smaller than the second outer diameter size.

13. The encoder of claim 12, wherein the support body includes an inner wall having a first inner diameter size, with the first inner diameter size being substantially equal to the second outer diameter size.

14. The encoder of claim 12, wherein the support body is configured to form a contact portion with the second shaft section and a non-contact portion with the first shaft section, wherein the encoder disc is located away from the contact portion via the non-contact portion.

15. The encoder of claim 13, wherein an inner wall side of the support body further includes a second inner diameter size, with the second inner diameter size being greater than the first inner diameter size.

16. The encoder of claim 15, wherein the support body is configured to form a contact portion and a non-contact portion with the second shaft section, wherein the encoder disc is located away from the contact portion via the non-contact portion.

17. The encoder of claim 1, wherein the support body is configured to form a contact portion and a non-contact portion relative to the second shaft section, with the non-contact portion being located near the first side surface of the support body.

18. The encoder of claim 1, wherein the detection result is output to a controller configured to control a rotational movement of the rotator based on the detection result.

19. The encoder of claim 18, wherein the rotator and the controller are incorporated in an image forming apparatus.

* * * * *